(12) United States Patent
Killian et al.

(10) Patent No.: US 6,477,697 B1
(45) Date of Patent: Nov. 5, 2002

(54) ADDING COMPLEX INSTRUCTION EXTENSIONS DEFINED IN A STANDARDIZED LANGUAGE TO A MICROPROCESSOR DESIGN TO PRODUCE A CONFIGURABLE DEFINITION OF A TARGET INSTRUCTION SET, AND HDL DESCRIPTION OF CIRCUITRY NECESSARY TO IMPLEMENT THE INSTRUCTION SET, AND DEVELOPMENT AND VERIFICATION TOOLS FOR THE INSTRUCTION SET

(75) Inventors: Earl A. Killian, Los Altos Hills; Richard Ruddell, Los Gatos; Albert Ren-Rui Wang, Fremont, all of CA (US)

(73) Assignee: Tensilica, Inc., Santa Clara, CA (US)

( * ) Notice: Subject to any disclaimer, the term of this patent is extended or adjusted under 35 U.S.C. 154(b) by 0 days.

(21) Appl. No.: 09/322,735

(22) Filed: May 28, 1999

Related U.S. Application Data

(63) Continuation-in-part of application No. 09/246,047, filed on Feb. 5, 1999.

(51) Int. Cl.⁷ ........................... G06F 17/50; G06F 15/00
(52) U.S. Cl. ................................. 716/18; 716/1; 716/3; 712/15; 712/17; 712/200
(58) Field of Search ............................. 716/18, 1, 3, 4, 716/16, 17; 712/15, 17, 41, 200, 32

(56) References Cited

U.S. PATENT DOCUMENTS

| | | | |
|---|---|---|---|
| 5,361,373 A | 11/1994 | Gilson ........................ | 395/800 |
| 5,696,956 A | 12/1997 | Razdan et al. ............... | 395/568 |
| 5,819,064 A | 10/1998 | Razdan et al. ............... | 395/500 |
| 6,006,022 A | * 12/1999 | Rhim et al. .................... | 716/1 |
| 6,035,123 A | 3/2000 | Razdan et al. ............... | 395/709 |

FOREIGN PATENT DOCUMENTS

| | | |
|---|---|---|
| GB | 2 308 470 A | 6/1997 |
| WO | WO97 13209 A | 4/1997 |

OTHER PUBLICATIONS

Hartool et al, "Generation of Software Tools From Processor Descriptions for Hardware/Software Codesign," ACM, Jun. 1997, pp. 303–306.*

Clucas, R.; "Designing with a customisable microprocessor core," Electronic Eng'g, vol. 71, No. 865, Feb. 1, 1999, p. 35.

Högl, H., et al., "Enable + +: A General–Purpose L2 Trigger Processor," Nuclear Science Symp. & Medical Imaging Conf., vol. 2, Oct. 21–28, 1995, pp. 667–671.

Wollan, V., "A Design Methodology Achieving Fast Development Cycles for Complex VLSI Architectures," Proc. on the European Conf. on Design Automation, Feb. 22–Mar. 25, 1993, pp. 532–535.

Tensilica, Inc; Xtensa Instruction Set Architecture (ISA) Reference Manual Revision 1.0.

(List continued on next page.)

*Primary Examiner*—Vuthe Siek
(74) *Attorney, Agent, or Firm*—Pillsbury Winthrop LLP

(57) ABSTRACT

An automated processor design tool uses a description of customized processor instruction set extensions in a standardized language to develop a configurable definition of a target instruction set, a Hardware Description Language description of circuitry necessary to implement the instruction set, and development tools such as a compiler, assembler, debugger and simulator which can be used to develop applications for the processor and to verify it. The standardized language is capable of handling instruction set extensions which modify processor state or use configurable processors. By providing a constrained domain of extensions and optimizations, the process can be automated to a high degree, thereby facilitating fast and reliable development.

20 Claims, 6 Drawing Sheets

OTHER PUBLICATIONS

Tensilica, Inc. Instruction Rxtension Language (TIE) Reference Manual Revision 1.3.

Compton et al., "Confgurable Computing: A Survey of Systems and Software," Technical Report, Northwestern University, Dept. of ECE, 1999.

Hauck et al., "The Chimaera Reconfigurable Functional Unit." Proceedings of the IEEE Symposium on Field-Programmable Custom Computing Machines, 1997.

Razdan et al., "A High-Performance Microarchitecture with Hardware-Programmable Function Units," Proceedings of MICRO-27, Nov. 1997.

Wang et al., "Hardware/Software Instruction Set Configurability for System-on-Chip Processors," Proceedings of Design Automation Conference, 2001.

* cited by examiner

ADDING COMPLEX INSTRUCTION EXTENSIONS DEFINED IN A STANDARDIZED LANGUAGE TO A MICROPROCESSOR DESIGN TO PRODUCE A CONFIGURABLE DEFINITION OF A TARGET INSTRUCTION SET, AND HDL DESCRIPTION OF CIRCUITRY NECESSARY TO IMPLEMENT THE INSTRUCTION SET, AND DEVELOPMENT AND VERIFICATION TOOLS FOR THE INSTRUCTION SET

CROSS-REFERENCE TO RELATED APPLICATION

This application is a continuation-in-part of U.S. patent application Ser. No. 09/246,047 to Killian et al., incorporated herein by reference Feb. 5, 1999.

BACKGROUND OF THE INVENTION

1. Field of the Invention

The present invention is directed to systems and techniques for designing programmable processing elements such as microprocessors and the like. More specifically, the invention is directed to the design of an application solution containing one or more processors where the processors in the system are configured and enhanced at the time of their design to improve their suitability to a particular application. In particular, the present invention is directed to a system in which application developers can rapidly develop instruction extensions, such as new instructions, to an existing instruction set architecture, including new instruction which manipulate user-defined processor state, and immediately measure the impact of the extension to the application run time and to the processor cycle time.

2. Background of the Related Art

Processors have traditionally been difficult to design and to modify. For this reason, most systems that contain processors use ones that were designed and verified once for general-purpose use, and then used by multiple applications over time. As such, their suitability for a particular application is not always ideal. It would often be appropriate to modify the processor to execute a particular application's code better (e.g., to run faster, consume less power, or cost less). However, the difficulty, and therefore the time, cost, and risk of even modifying an existing processor design is high, and this is not typically done.

Another difficulty with prior art processor design stems from the fact that it is not appropriate to simply design traditional processors with more features to cover all applications, because any given application only requires a particular set of features, and a processor with features not required by the application is overly costly, consumes more power and is more difficult to fabricate. In addition, it is not possible to know all of the application targets when a processor is initially designed. If the processor modification process could be automated and made reliable, then the ability of a system designer to create application solutions would be significantly enhanced.

Because the processor cannot easily be enhanced, many system designers do not attempt to do so, and instead choose to execute an inefficient pure-software solution on an available general-purpose processor. The inefficiency results in a solution that may be slower, or require more power, or be costlier (e.g., it may require a larger, more powerful processor to execute the program at sufficient speed). Other designers choose to provide some of the processing requirements in special-purpose hardware that they design for the application, such as a coprocessor, and then have the programmer code up access to the special-purpose hardware at various points in the program. However, the time to transfer data between the processor and such special-purpose hardware limits the utility of this approach to system optimization because only fairly large units of work can be sped up enough so that the time saved by using the special-purpose hardware is greater than the additional time required to transfer data to and from the specialized hardware.

A possible solution to the problem of accommodating specific application requirements in processors is to use configurable processors having instruction sets and architectures which can be easily modified and extended to enhance the functionality of the processor and customize that functionality. Configurability allows the designer to specify whether or how much additional functionality is required for her product. The simplest sort of configurability is a binary choice: either a feature is present or absent. For example, a processor might be offered either with or without floating-point hardware. A highly advantageous system for developing, testing and implementing configurable processors is disclosed in United States patent application Ser. No. 09/246,047 to Killian et al.

There are several challenges which have largely prevented this method of improving application performance from becoming a mainstream design technique. The first challenge is in describing in a formal way the semantics of the new instructions. The Killian et al. application, for example, provided a specification language called the TIE™ (Tensilica Instruction Set-Extensions) language developed by Tensilica Corporation of Santa Clara, Calif. for defining new instructions; however, TIE is limited in the types of instructions which it can define. Specifically, TIE-defined instructions cannot access or modify any information stored in special registers, i.e., processor state, which significantly restricts the range of instructions obtainable and therefore limit the amount of performance improvement achievable.

Second, inventing new application-specific instructions involves complicated tradeoffs between cycle count reduction, additional hardware resources and CPU cycle-time impact. The third challenge is to obtain efficient hardware implementations for the new instructions without involving applications developers in the often tricky details of high-performance microprocessor implementations.

SUMMARY OF THE INVENTION

In view of the above problems of the prior art, it is an object of the present invention to provide a system and method for developing and implementing instruction set extensions which modify processor state.

It is another object of the present invention to provide a system and method for developing and implementing instruction set extensions that modify configurable processor registers.

These objects are achieved according to an aspect of the present invention by providing an automated processor design tool which uses a description of customized processor instruction set extensions in a standardized language to develop a configurable definition of a target instruction set, a Hardware Description Language description of circuitry necessary to implement the instruction set, and development tools such as a compiler, assembler, debugger and simulator which can be used to develop applications for the processor and to verify it. The standardized language is capable of handling instruction set extensions which modify processor state or use configurable processors. By providing a constrained domain of extensions and optimizations, the process can be automated to a high degree, thereby facilitating fast and reliable development.

BRIEF DESCRIPTION OF THE DRAWINGS

These and other objects, features, and advantages of the present invention are better understood by reading the following detailed description of the preferred embodiment, taken in conjunction with the accompanying drawings, in which.

DETAILED DESCRIPTION OF THE PRESENTLY PREFERRED EXEMPLARY EMBODIMENT

Figure 1:
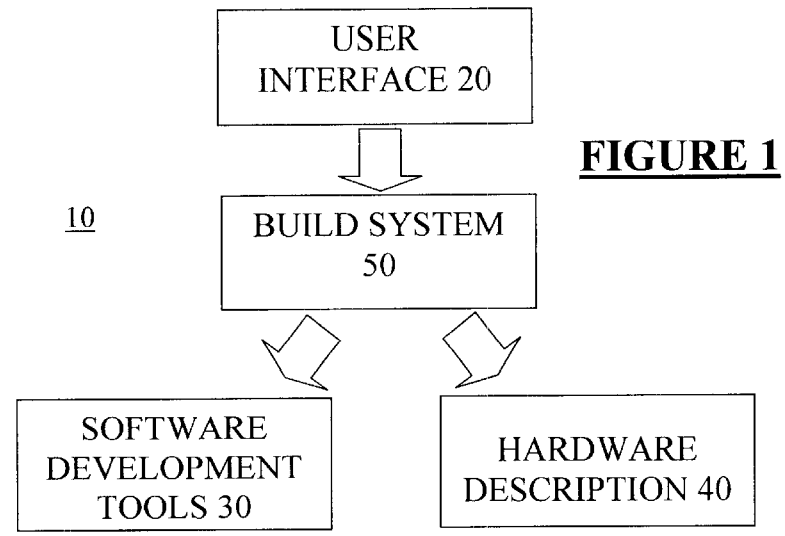
FIG. 1 is an overall block diagram of a preferred embodiment of the present invention.

An automated processor generation system 10 according to a preferred embodiment of the present invention has four major components as shown in FIG. 1: a user configuration interface 20 through which a user wishing to design a processor enters her configurability and extensibility options and other design constraints; a suite of software development tools 30 which can be customized for a processor designed to the criteria chosen by the user; a parameterized, extensible description of a hardware implementation of the processor 40; and a build system 50 receiving input data from the user interface, generating a customized, synthesizable hardware description of the requested processor, and modifying the software development tools to accommodate the chosen design. Preferably, the build system 50 additionally generates diagnostic tools to verify the hardware and software designs and an estimator to estimate hardware and software characteristics.

The above components are preferably similar to those described in the above-mentioned Killian et al. application, and for simplicity and brevity will not be described in further detail here except to the extent that the preferred embodiment of the present invention differs therefrom.

Figure 2:
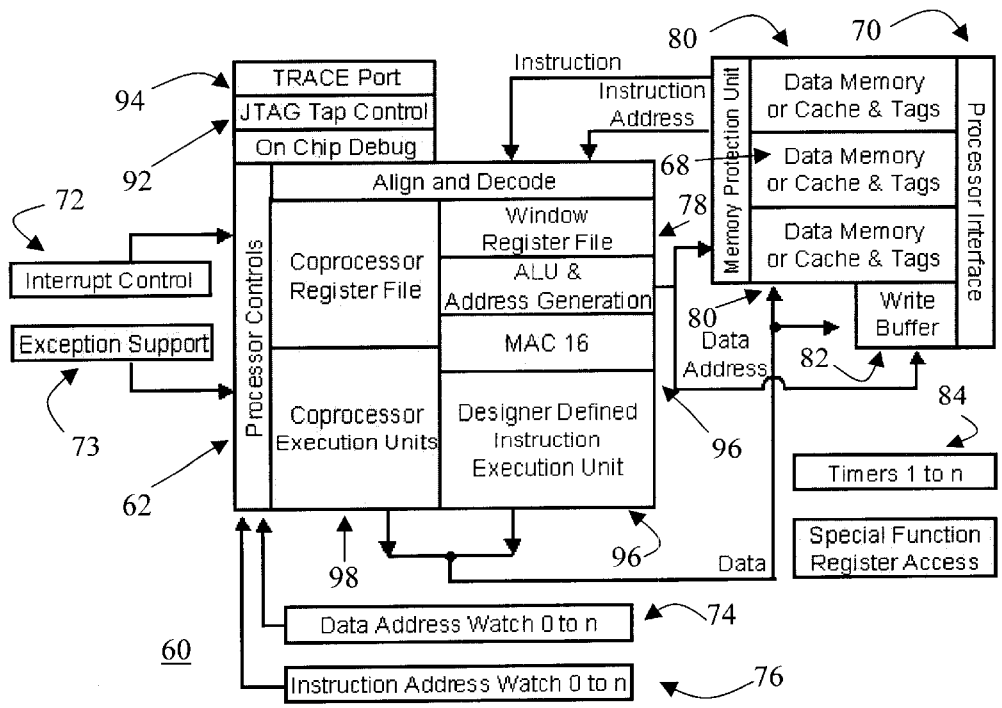
FIG. 2 is a block diagram of the architecture of a configurable processor according to the preferred embodiment.

In the preferred embodiment, the basis for processor configuration is the architecture 60 shown in FIG. 2. A number of elements of the architecture are basic features which cannot be directly modified by the user. These include the processor controls section 62, the align and decode section 64 (although parts of this section are based on the user-specified configuration), the ALU and address generation section 66, the branch logic and instruction fetch 68, and the processor interface 70. Other units are part of the basic processor but are user-configurable. These include the interrupt control section 72, the data and instruction address watch sections 74 and 76, the window register file 78, the data and instruction cache and tags sections 80, the write buffers 82 and the timers 84. The remaining sections shown in FIG. 2 are optionally included by the user.

Of particular interest in the context of the present invention is the designer-defined instruction execution unit 96, for it is there that TIE-defined instructions, including those modifying processor state, are decoded and executed. As noted above, the TIE language allows the user to describe custom functions for his applications in the form of extensions and new instructions to augment the base ISA. A TIE description uses a number of building blocks to delineate the attributes of new instructions as follows:

| -- instruction fields | -- instruction classes |
| -- instruction opcodes | -- instruction semantics |
| -- instruction operands | -- constant tables |

In the present invention, a number of building blocks have been added to the language to make it possible to declare additional processor states which can be read and written by the new instructions. These "state" statements are used to declare the addition processor states. The declaration begins with the keyword state. The next section of the state statements describes the size, number of bits, of the state and how the bits of the states are indexed. The section following that is the name of the state, used to identify the state in other description sections. The last section of the "state" statement is a list of attributes associated with the state. For example, state [63:0] DATA cpn=0 autopack
state [27:0] KEYC cpn=1 nopack
state [27:0] KEYD cpn=1 defines three new processor states, DATA, KEYC, and KEYD. State DATA is 64-bits wide and the bits are indexed from 63 to 0. KEYC and KEYD are both 28-bit states. DATA has a coprocessor-number attribute cpn indicating to which coprocessor data DATA belongs.

The attribute "autopack" indicate that the state DATA will be automatically mapped to some registers in the user-register file so that the value of DATA can be read and written by software tools.

The user_register section is defined to indicate the mapping of states to registers in the user register file. A user_register section starts with a keyword user_register, followed by a number indicating the register number, and ends with an expression indicating the state bits to be mapped onto the register. For example, user_register 0 DATA[31:0]
user_register 1 DATA[63:32]
user_register 2 KEYC
user_register 3 KEYD
user_register 4 {X, Y, Z} specifies that the low-order word of DATA is mapped to the first user register file and the high order word to the second. The next two user register file entries are used to hold values of KEYC and KEYD. Clearly, the state information used in this section must be consistent with that of the state section.

Here, the consistency can be checked automatically by a computer program.

In another embodiment of the present invention, such an assignment of state bits to user register file entries is derived automatically using bin-packing algorithms. In yet another embodiment, a combination of manual and automatic assignments can be used, for example, to ensure upward compatibility.

Instruction field statements field are used to improve the readability of the TIE code. Fields are subsets or concatenations of other fields that are grouped together and referenced by a name. The complete set of bits in an instruction is the highest-level superset field inst, and this field can be divided into smaller fields. For example,

| field x | inst [11:8] |
|---------|-------------|
| field y | inst [15:12] |
| field xy | {x, y} | defines two 4-bit fields, x and y, as sub-fields (bits 8–11 and 12–15, respectively) of a highest-level field inst and an 8-bit field xy as the concatenation of the x and y fields.

The statements opcode define opcodes for encoding specific fields. Instruction fields that are intended to specify operands, e.g., registers or immediate constants, to be used by the thus-defined opcodes, must first be defined with field statements and then defined with operand statements.

For example,

| opcode | acs op2 = 4'b0000 | CUST0 |
|--------|-------------------|-------|
| opcode | adsel op2 = 4'b0001 | CUST0 | defines two new opcodes, acs and adsel, based on the previously-defined opcode CUST0 (4'b00000 denotes a four bit-long binary constant 0000). The TIE specification of the preferred core ISA has the statements

| field op0 | inst [3:0] |
|-----------|------------|
| field op1 | inst [19:16] |
| field op2 | inst [23:20] |
| opcode | QRST op0 = 4'b0000 |
| opcode | CUST0 op1 = 4'b0100 QRST | as part of its base definitions. Thus, the definitions of acs and adsel cause the TIE compiler to generate instruction decoding logic respectively represented by the following:

inst[23:0]= 0000 0110 xxxx xxxx xxxx 0000 inst[23:0]= 0001 0110 xxxx xxxx xxxx 0000

Instruction operand statements operand identify registers and immediate constants. Before defining a field as an operand, however, it must have been previously been defined as a field as above. If the operand is an immediate constant, the value of the constant can be generated from the operand, or it can be taken from a previously defined constant table defined as described below. For example, to encode an immediate operand the TIE code

| field | offset | inst [23:6] |
|-------|--------|-------------|
| operand | offsets4 | offset { |

-continued

| assign | offsets4 = {{14{offset[17]}}, offset}<<2; |
|--------|-------------------------------------------|
| }{ | |
| wire | [31:0] t; |
| assign | t = offsets4>>2; |
| assign | offset = t [17:0]; |
| } | | defines an 18-bit field named offset which holds a signed number and an operand offsets4 which is four times the number stored in the offset field. The last part of the operand statement actually describes the circuitry used to perform the computations in a subset of the Verilog™ HDL for describing combinatorial circuits, as will be apparent to those skilled in the art.

Here, the wire statement defines a set of logical wires named t thirty-two bits wide. The first assign statement after the wire statement specifies that the logical signals driving the logical wires are the offsets4 constant shifted to the right, and the second assign statement specifies that the lower eighteen bits of t are put into the offset field. The very first assign statement directly specifies the value of the offsets4 operand as a concatenation of offset and fourteen replications of its sign bit (bit 17) followed by a shift-left of two bits.

For a constant table operand, the TIE code

```
table prime 16 {
2, 3, 5, 7, 9, 11, 13, 17, 19, 23, 29, 31, 37, 41, 43, 47, 53
}
operand              prime_s s {
assign               prime_s = prime[s];
{ }
       assign s =    prime_s == prime [0]    ?    4'b0000 :
                    prime_s == prime [1]    ?    4'b0001 :
                    prime_s == prime [2]    ?    4'b0010 :
                    prime_s == prime [3]    ?    4'b0011 :
                    prime_s == prime [4]    ?    4'b0100 :
                    prime_s == prime [5]    ?    4'b0101 :
                    prime_s == prime [6]    ?    4'b0110 :
                    prime_s == prime [7]    ?    4'b0111 :
                    prime_s == prime [8]    ?    4'b1000 :
                    prime_s == prime [9]    ?    4'b1001 :
                    prime_s == prime [10]   ?    4'b1010 :
                    prime_s == prime [11]   ?    4'b1011 :
                    prime_s == prime [12]   ?    4'b1100 :
                    prime_s == prime [13]   ?    4'b1101 :
                    prime_s == prime [14]   ?    4'b1110 :
                                                 4'b1111;
       }
``` makes use of the table statement to define an array prime of constants (the number following the table name being the number of elements in the table) and uses the operand s as an index into the table prime to encode a value for the operand prime_s (note the use of Verilog™ statements in defining the indexing).

The instruction class statement iclass associates opcodes with operands in a common format. All instructions defined in an iclass statement have the same format and operand usage. Before defining an instruction class, its components must be defined, first as fields and then as opcodes and operands. For example, building on the code used in the preceding example defining opcodes acs and adsel, the additional statements

| operand | art | t | {assign art = AR[t];} {} |
| operand | ars | s | {assign ars = AR{s};} {} |
| operand | arr | r | {assign AR[r] = arr;} {} | use the operand statement to define three register operands art, ars and arr (again note the use of Verilog™ statements in the definition). Then, the iclass statement iclass viterbi {adsel, acs} {out arr, in art, in ars} specifies that the operands adsel and acs belong to a common class of instructions viterbi which take two register operands art and ars as input and writes output to a register operand arr.

In the present invention, the instruction class statement "iclass" is modified to allow the specification of state-access information of instructions. It starts with a keyword "iclass", is followed by the name of the instruction class, the list of opcodes belonging to the instruction class and a list of operand access information, and ends with a newly-defined list for state access information. For example,

| iclass lddata | {LDDATA} | {out arr, in imm4} | {in DATA} |
| iclass stdata | {STDATA} | {in ars, in art} | {out DATA} |
| iclass stkey | {STKEY} | {in ars, in art} | {out KEYC, out KEYD} |
| iclass des | {DES} | {out arr, in imm4} | {inout KEYC, inout DATA, inout KEYD} | defines several instruction classes and how various new instructions access the states. The keywords "in", "out", and "inout" are used to indicate that the state is read, written, or modified (read and written) by the instructions in the iclass. In this example, state "DATA" is read by the instruction "LDDATA", state "KEYC" and "KEYD" are written by the instruction "STKEY", and "KEYC", "KEYD", and "DATA" are modified by the instruction "DES".

The instruction semantic statement semantic describes the behavior of one or more instructions using the same subset of Verilog™ used for coding operands. By defining multiple instructions in a single semantic statement, some common expressions can be shared and the hardware implementation can be made more efficient. The variables allowed in semantic statements are operands for opcodes defined in the statement's opcode list, and a single-bit variable for each opcode specified in the opcode list. This variable has the same name as the opcode and evaluates to 1 when the opcode is detected. It is used in the computation section (the Verilog™ subset section) to indicate the presence of the corresponding instruction.

```
// define a new opcode for BYTESWAP based on
// - a predefined instruction field op2
// - a predefined opcode CUST0
// refer to Xtensa ISA manual for descriptions of op2 and CUST0
opcode BYTESWAP op2=4'b0000 CUST0
// declare state SWAP and COUNT
state COUNT 32
state SWAP 1
// map COUNT and SWAP to user register file entries
user_register 0 COUNT
user_register 1 SWAP
// define a new instruction class that
// - reads data from ars (predefined to be AR[s])
```

```
// - uses and writes state COUNT
// - uses state SWAP
iclass bs {BYTESWAP} {out arr, in ars} {inout COUNT, in SWAP}
// semantic definition of byteswap
// COUNT the number of byte-swapped words
// Return the swapped or un-swapped data depending on SWAP
semantic bs {BYTESWAP} {
wire [31:0] ars_swapped = {ars[7:0],ars[15:8],ars[23:16],ars[31:24]};
assign arr = SWAP ? ars_swapped : ars;
assign COUNT = COUNT + SWAP;
}
```

The first section of the above code defines an opcode for the new instruction, called BYTESWAP.

// define a new opcode for BYTESWAP based on
// - a predefined instruction field op2
// - a predefined opcode CUST0
// refer to Xtensa ISA manual for descriptions of op2 and CUST0
opcode BYTESWAP op2=4'b0000 CUST0

Here, the new opcode BYTESWAP is defined as a sub-opcode of CUST0. From the Xtensa™ Instruction Set Architecture Reference Manual described in greater detail below, one sees that CUST0 is defined as opcode QRST op0=4'b0000
opcode CUST0 op1=4'b0100 QRST where op0 and op1 are fields in the instruction. Opcodes are typically organized in a hierarchical fashion. Here, QRST is the top-level opcode and CUST0 is a sub-opcode of QRST and BYTESWAP is in turn a sub-opcode of CUST0. This hierarchical organization of opcodes allows logical grouping and management of the opcode spaces.

The second declaration declares additional processor states needed by the BYTESWAP instruction:

declare state SWAP and COUNT
state COUNT 32
state SWAP 1

Here, COUNT is declared as a 32-bit state and SWAP as a 1-bit state. The TIE language specifies that the bits in COUNT are indexed from 31 to 0 with bit 0 being least significant.

The Xtensa™ ISA provides two instructions, RSR and WSR, for saving and restoring special system registers. Similarly, it provides two other instructions, RUR and WUR (described in greater detail below) for saving and restoring states which are declared in TIE. In order to save and restore states declared in TIE, one must specify the mapping of the states to entries in the user register file that RUR and WUR instructions can access. The following section of the above code specifies this mapping:

// map COUNT and SWAP to user register file entries
user register 0 COUNT
user_register 1 SWAP such that the following instructions will save the value of COUNT to a2 and SWAP to a5:

RUR a2, 0;
RUR a5, 1;

This mechanism is actually used in the test program to verify the contents of the states. In C, the above two instructions would look like:

x = RUR(0);
y = RUR(1);

The nest section in the TIE description is the definition of a new instruction class containing the new instruction BYTESWAP:

```
// define a new instruction class that
// - reads data from ars (predefined to be AR[s])
// - uses and writes state COUNT
// - uses state SWAP
    iclass bs {BYTESWAP} {out arr, in ars} {inout COUNT,
        in SWAP}
```
where iclass is the keyword and bs is the name of the iclass. The next clause lists the instruction in this instruction class (BYTESWAP). The clause after than specifies the operands used by the instructions in this class (in this case an input operand ars and an output operand arr). The last clause in the iclass definition specifies the states which are accessed by the instruction in this class (in this case the instruction will read state SWAP and read and write state COUNT).

The last block in the above code gives the formal semantic definition for the BYTESWAP instruction:

```
// semantic definition of byteswap
// COUNT the number of byte-swapped words
// Return the swapped or un-swapped data depending on
    SWAP
    semantic bs {BYTESWAP} {
        wire [31:0] ars_swapped = {ars[7:0],ars[15:8],ars
            [23:16],ars[31:24]};
        assign arr = SWAP ? ars_swapped: ars;
        assign COUNT = COUNT +SWAP;
    }
```

The description uses a subset for Verilog HDL for describing combination logic. It is this block that defines precisely how the instruction set simulator will simulate the BYTESWAP instruction and how the additional circuitry is synthesized and added to the Xtensa™ processor hardware to support the new instruction.

In the present invention implementing user-defined states, the declared states can be used just like any other variables for accessing information stored in the states. A state identifier appearing on the right hand side of an expression indicates the read from the state. Writing to a state is done by assigning the state identifier with a value or an expression. For example, the following semantic code segment shows how the states are read and written by an instruction:

```
    assign KEYC = sr == 8'd2 ? art[27:0 ] : KEYC;
    assign KEYD = sr == 8'd3 ? art[27:0 ] : KEYD;
    assign DATA = sr == 8'd0 ? {DATA[63:32 ], art} : {art,
        DATA[63:32]};
```

The Xtensa™ Instruction Set Architecture (ISA) Reference Manual, Revision 1.0 by Tensilica, Inc. is incorporated herein by reference for the purposes of illustrating examples of instructions that can be implemented within the configurable processor as core instructions and instructions which are available via the selection of configuration options. Further, the Instruction Extension Language (TIE) Reference Manual Revision 1.3, also by Tensilica, Inc., is incorporated by reference to show examples of TIE language instructions which can be used to implement such user-defined instructions.

From the TIE description, new hardware implementing the instructions can be generated using, e.g., a program similar to the one shown in Appendix A. Appendix B shows the code for header files needed to support new instructions as intrinsic functions.

Using the configuration specification, the following can be automatically generated:

instruction decode logic of the processor 60;

illegal instruction detection logic for the processor 60;

the ISA-specific portion of the assembler;

the ISA-specific support routines for the compiler;

the ISA-specific portion of the disassembler (used by the debugger); and the ISA-specific portion of the simulator.

Figure 3:
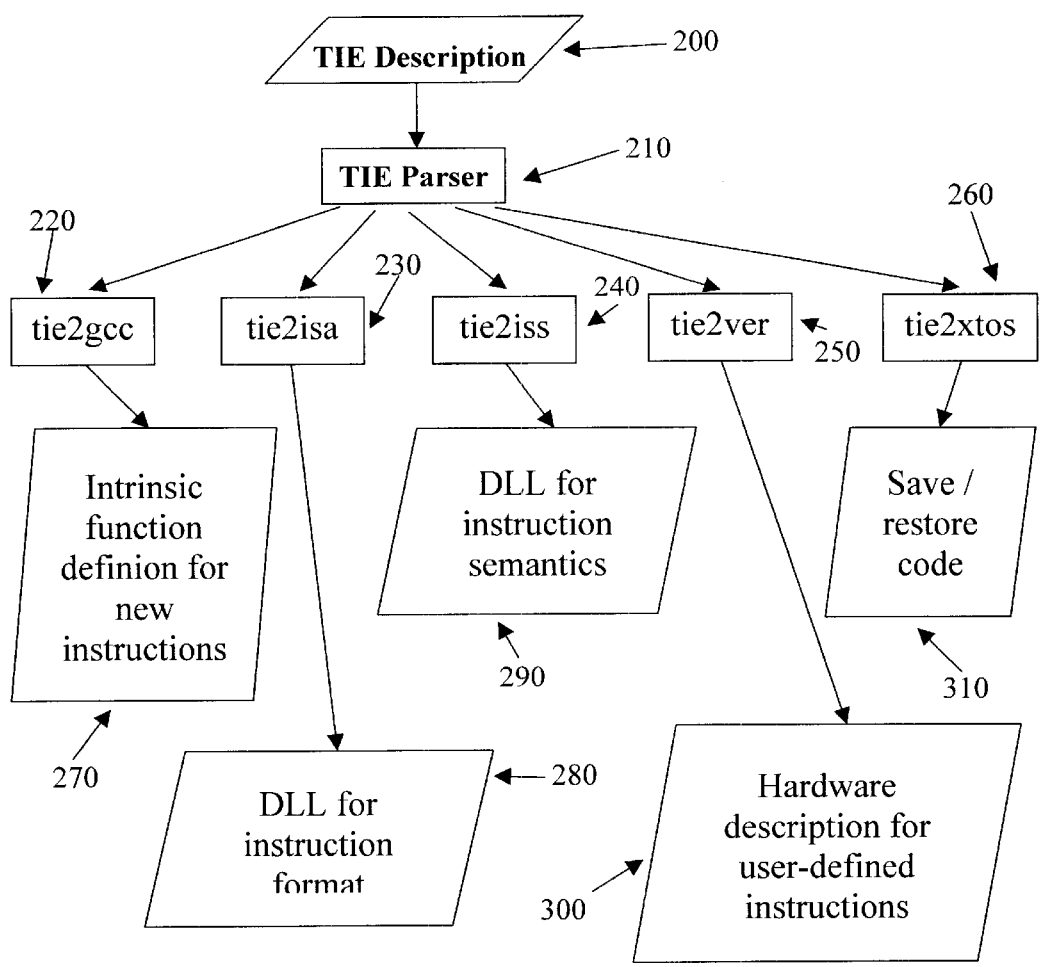
FIG. 3 is a block diagram showing the generation of various software modules used in the preferred embodiment.

FIG. 3 is a diagram of how the ISA-specific portions of these software tools are generated. From a user-created TIE description file 200, a TIE parser program 210 generates C code for several programs, each of which produces a file accessed by one or more of the software development tools for information about the user-defined instructions and state. For example, the program tie2gcc 220 generates a C header file 270 called xtensa-tie.h which contains intrinsic function definitions for new instructions. The program tie2isa 230 generates a dynamic linked library (DLL) 280 which contains information on user-defined instruction format (in the Wilson et al. application discussed below, this is effectively a combination of the encode and decode DLLs discussed therein). The program tie2iss 240 generates performance modeling routines and produces a DLL 290 containing instruction semantics which, as discussed in the Wilson et al. application, is used by a host compiler to produce a simulator DLL used by the simulator. The program tie2ver 250 produces necessary descriptions 300 for user-defined instructions in an appropriate hardware description language. Finally, the program tie2xtos 260 produces save and restore code 310 for use by RUR and WUR instructions.

The precise descriptions of instructions and how they access states make it possible to use the hardware generation procedure described in the Killian et al. application to produce efficient logic that can plug into an existing high-performance microprocessor designs. Further, adaptation of the instruction set simulator and debugger described in the Killian et al. application for use with user-defined state is described in the United States Patent Application to Wilson et al. entitled "System and Method for Dynamically Designing and Evaluating Configurable Processor Instructions", Ser. No. 09/323.161, incorporated herein by reference. The methods described in connection with the preferred embodiment of the present invention specifically deal with those new instructions which read from or write to one or more state registers. In particular, this embodiment shows how to derive hardware logic for state registers in the context a class of microprocessor implementation styles which all use pipelining as a technique to achieve high performance.

Figure 4:
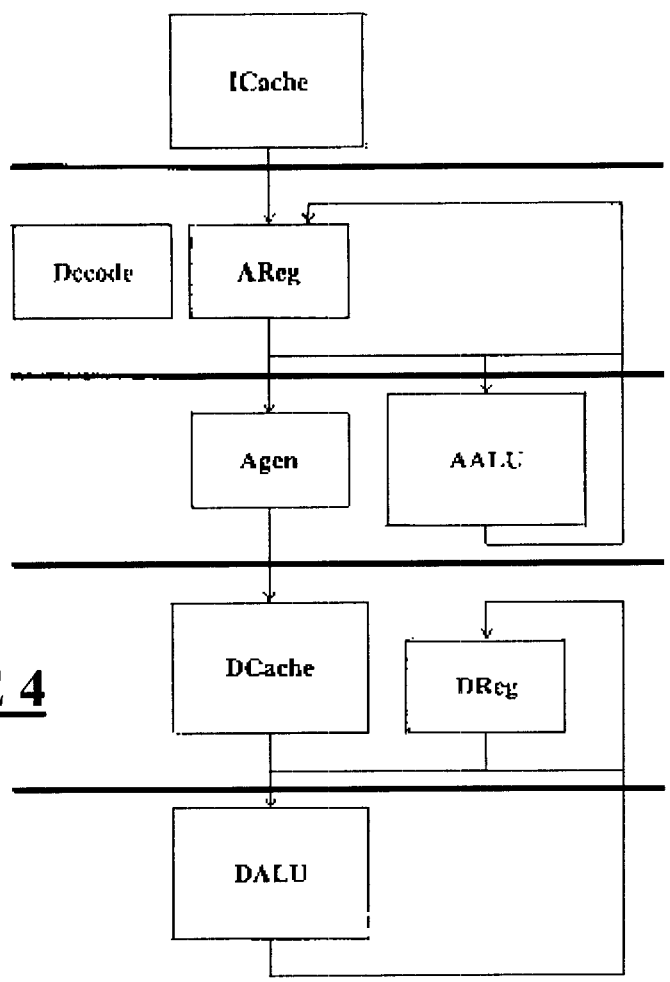
FIG. 4 is a block diagram of a pipeline structure in a configurable processor according to the preferred embodiment.
Figure 5:
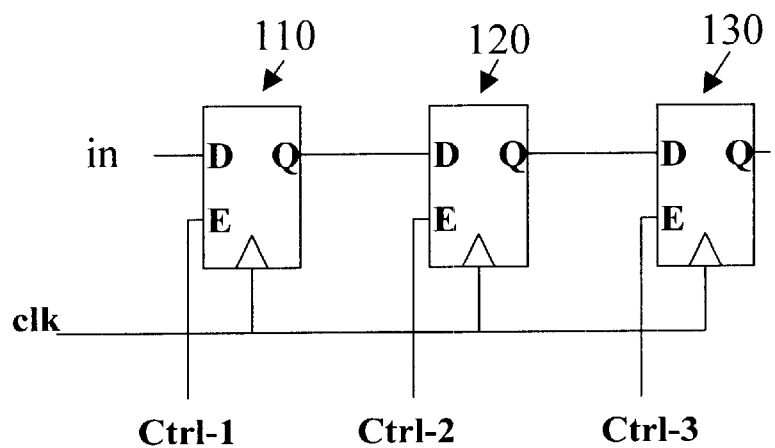
FIG. 5 is a state register implementation according to the preferred embodiment.

In a pipelined implementation such as the one shown in FIG. 4, a state register is typically duplicated several times, each instantiation representing the value of the state at a particular pipeline stage. In this embodiment, a state is translated into multiple copies of registers consistent with the underlying core processor implementation. Additional bypass and forward logic are also generated, again in a manner consistent with the underlying core processor implementation. For example, to target a core processor implementation that consists of three execution stages, the preferred embodiment would translate a state into three registers connected as shown in FIG. 5. In this implementation, each register 110–130 represents the value of the state in at one of the three pipeline stages. ctrl-1, ctrl-2, and ctrl-3 are control signals used to enable the data latching in the corresponding flip-flops 110–130.

To make multiple copies of a state register work consistently with the underlying processor implementation requires additional logic and control signals. "Consistently" means that the state should behave exactly the same way as the rest of the processor states under conditions of interrupts, exceptions and pipeline stalls. Typically, a given processor implementation defines certain signals representing various pipeline conditions. Such signals are required to make the pipeline state registers work properly.

In a typical pipelined implementation, the execution unit consists of multiple pipeline stages. The computation of an instruction is carried out in multiple stages in this pipeline. Instruction streams flow through the pipeline in sequence as directed by the control logic. At any given time, there can be up to n instructions being executed in the pipeline, where n is the number of stages. In a superscalar processor, also implementable using the present invention, the number of instructions in the pipeline can be n·w, wherein w is the issue width of the processor.

The role of the control logic is to make sure the dependencies between the instructions are obeyed and any interference between instructions is resolved. If an instruction uses data computed by an earlier instruction, special hardware is needed to forward the data to the later instruction without stalling the pipeline. If an interrupt occurred, all instructions in the pipeline need to be killed and later on re-executed. When an instruction cannot be executed because its input data or the computational hardware it needs is not available, the instruction must be stalled. One cost effective way of stalling an instruction is to kill it in its first execution stage and re-execute the instruction in the next cycle. A consequence of this technique is creating an invalid stage (bubble) in the pipeline. This bubble flows through the pipeline along with other instructions. At the end of the pipeline where instructions are committed, the bubbles are thrown away.

Figure 6:
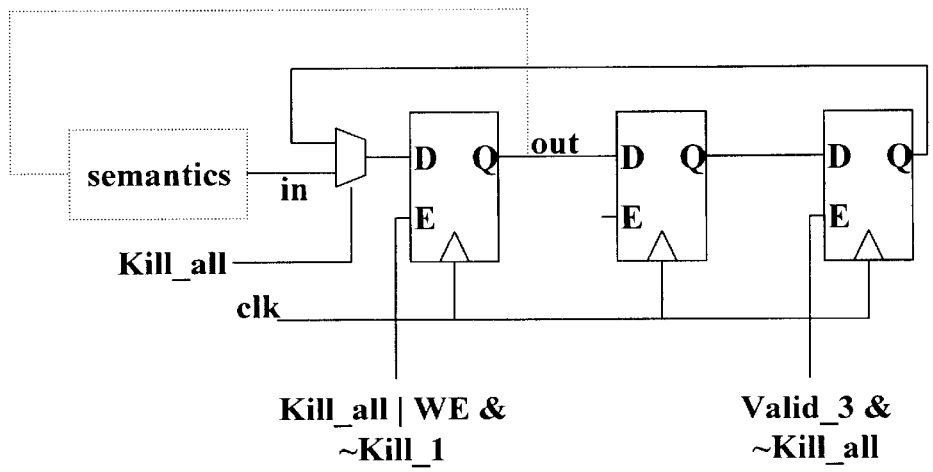
FIG. 6 is a diagram of additional logic needed to implement the state register implementation.

Using the above three-stage pipeline example, a typical implementation of such a processor state requires the additional logic and connections shown in FIG. 6.

Under normal situations, a value computed in a stage will be forwarded to the next instructions immediately without waiting for the value to reach the end of the pipeline in order to reduce the number of pipeline stalls introduced by the data dependencies. This is accomplished by sending the output of the first flip-flop 110 directly to the semantic block such that it can be used immediately by the next instruction. To handle abnormal conditions such as interrupts and exceptions, the implementation requires the following control signals: Kill_1, Kill_all and Valid_3.

Signal "Kill_1" *indicates that the instruction currently in the first pipeline stage* 110 *must be killed due to reasons such as not having the data it needs to proceeds. Once the instruction is killed, it will be retried in the next cycle. Signal "Kill_*all" indicates that all the instructions currently in the pipeline must be killed for reasons such as an instruction ahead of them has generated an exception or an interrupt has occurred. Signal "Valid_3" indicates whether the instruction currently in the last stage 130 is valid or not. Such a condition is often the result of killing an instruction in the first pipeline stage 110 and causing a bubble (invalid instruction) in the pipeline. "Valid_3" simply indicates whether the instruction in the third pipeline stage is valid or a bubble. Clearly, only valid instructions should be latched.

Figure 7:
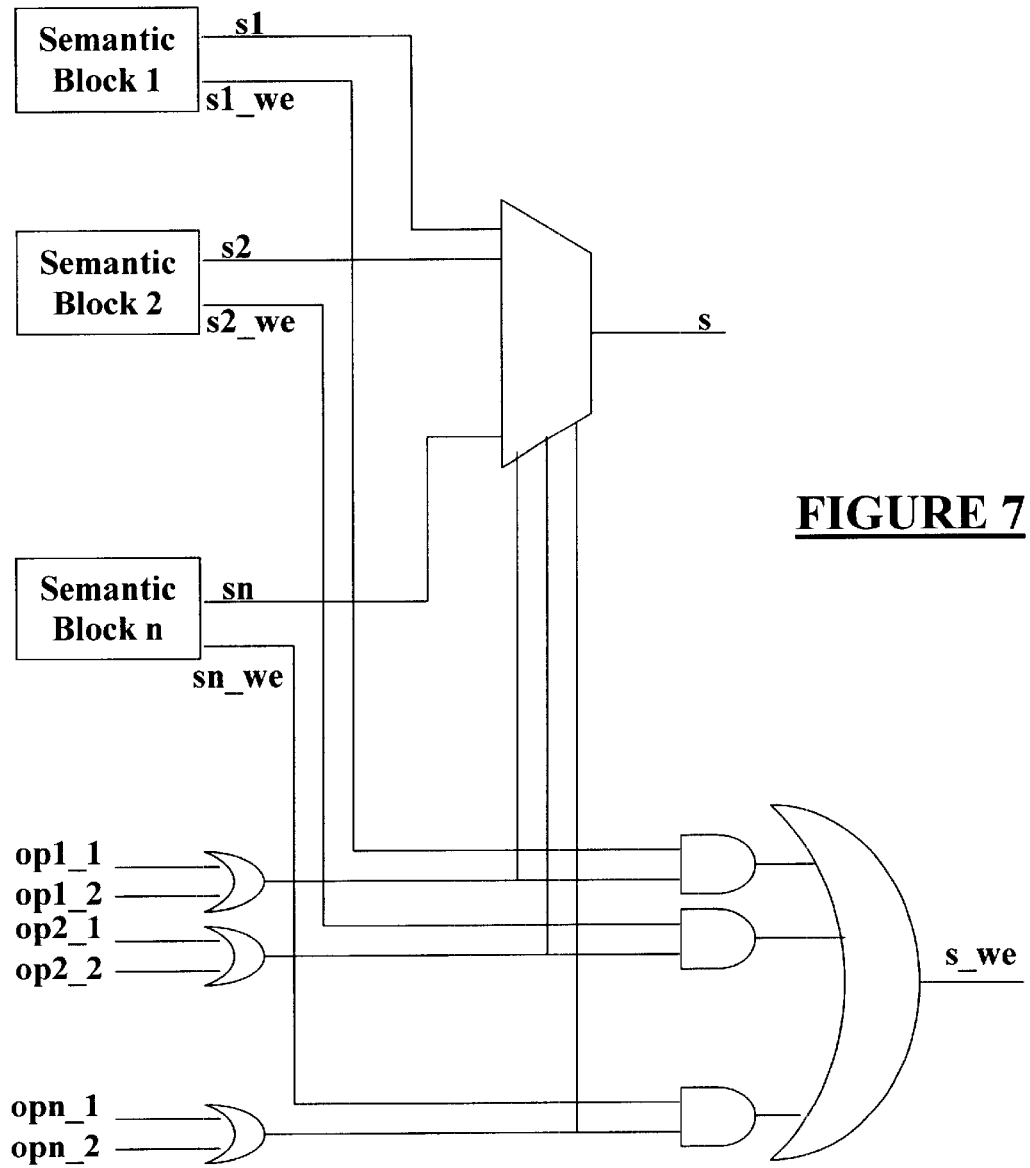
FIG. 7 is a diagram showing the combination of the next-state output of a state from several semantic blocks and selection one to input to a state register according to the preferred embodiment.

FIG. 7 shows the additional logic and connections needed to implement the state register. It also shows how to construct the control logic to drive the signals "ctrl-1", "ctrl-2", and "ctrl-3" such that this state-register implementation meets the above requirements. The following is sample HDL code automatically generated to implement the state register as shown in FIG. 6.

```
module tie_enflop(tie_out, tie_in, en, clk);
  parameter size = 32;
  output [size-1:0 ] tie_out;
  input [size-1:0]tie_in;
  input en;
  input clk;
  reg [size-1:0] tmp;
  assign tie_out = tmp;
  always @(posedge clk) begin
    if (en)
      tmp <= #1 tie_in;
  end
endmodule
module tie_athens_state(ns, we, ke, kp, vw, clk, ps);
  parameter size = 32;
  input [size-1:0] ns; // next state
  input we; // write enable
  input ke; // Kill E state
  input kp; // Kill Pipeline
  input vw; // Valid W state
  input clk; // clock
  output [size-1:0] ps; // present state
  wire [size-1:0] se; // state at E stage
  wire [size-1:0] sm; // state at M stage
  wire [size-1:0] sw; // state at W stage
  wire [size-1:0] sx; // state at X stage
  wire ee; // write enable for EM register
  wire ew; // write enable for WX register
  assign se = kp ? sx : ns;
  assign ee = kp |we & ~ke;
  assign ew = vw & ~kp;
  assign ps = sm;
  tie_enflop #(size) state_EM(.tie_out(sm), tie_in(se),
    .en(ee), \.clk(clk));
  tie_enflop #(size) state_MW(.tie_out(sw), tie_in(sm),
    .en(1'b1), \.clk(clk));
  tie_enflop #(size) state_WX(.tie_out(sx), tie_in(sw),
    .en(ew), \.clk(clk));
endmodule
```

Using the above pipelined state register model, the present state value of the state is passed to the semantic block as an input variable if the semantic block specifies the state as its input. If the semantic block has the logic to generate the new value for a state, an output signal is created. This output signal is used as the next-state input to the pipelined state register.

The preferred embodiment allows multiple semantic description blocks each of which describes the behavior for multiple instructions. Under this unrestricted description style, it is possible that only a subset of the semantic blocks produce next-state output for a given state. Furthermore, it is also possible that a given semantic block produces the next-state output conditionally depending on what instruction it is executing at a given time. Consequently, additional hardware logic is needed to combine the next-state outputs from all semantic blocks to form the input to the pipelined state register. In the preferred embodiment of the invention, a signal is automatically derived for each semantic block indicating whether this block has produced a new value for the state. In another embodiment, such a signal can be left to the designer to specify.

FIG. 7 shows how to combine the next-state output of a state from several semantic blocks s1–sn and appropriately select one to input to the state register. In this Figure, op1_1 and op1_2 are opcode signals for the first semantic block, op2_1 and op2_2 are opcode signals for the second semantic block, etc. The next-state output of semantic block i is si (there are multiple next-state outputs for the block if there are multiple state registers). The signal indicating that semantic block i has produced a new value for the state is si_we. Signal s_we indicates whether any of the semantic blocks produce a new value for the state, and is used as an input to the pipelined state register as the write-enable signal.

Even though the expressive power of the multiple semantic block is no more than that of a single one, it does provide a way for implementing more structured descriptions, typically by grouping related instructions into a single block. Multiple semantic blocks can also lead to simpler analysis of instructions effects because of the more restricted scope in which the instructions are implemented. On the other hand, there are often reasons for a single semantic block to describe the behavior of multiple instructions. Most often, it is because the hardware implementation of these instructions share common logic. Describing multiple instructions in a single semantic block usually leads to more efficient hardware design hardware design.

Because of interrupts and exceptions, it is necessary for software to restore and load the values of the states to and from data memory. Based on the formal description of the new states and new instructions, it is possible to automatically generate such restore and load instructions. In a preferred embodiment, the logic for the restore and load instructions is automatically generated as two semantic blocks which can then be recursively translated into actual hardware just like any other blocks. For example, from the following declaration of states:

state [63:0] DATA cpn=0 autopack
    state [27:0] KEYC cpn=1 nopack
    state [27:0] KEYD cpn=1
    user_register 0 = DATA[31:0];
    user_register 1 = DATA[63:32];
    user_register 2 = KEYC;
    user_register 3 = KEYD;

the following semantic block can be generated to read the values of "DATA", "KEYC", and "KEYD" into general purpose registers:

```
iclass rur {RUR} {out arr, in st} {in DATA, in KEYC, in KEYD}
semantic rur (RUR) {
            wire sel_0 =   (st == 8'd0);
            wire sel_1 =   (st == 8'd1);
            wire sel_2 =   (st == 8'd2);
            wire sel_3 =   (st == 8'd3);
            assign arr =   {32{sel_0}} & DATA[31:0] |
                           {32{sel_1}} & DATA[64:32] |
                           {32{sel_2}} & KEYC |
                           {32{sel_3}} & KEYD;
}
```

Figure 8:
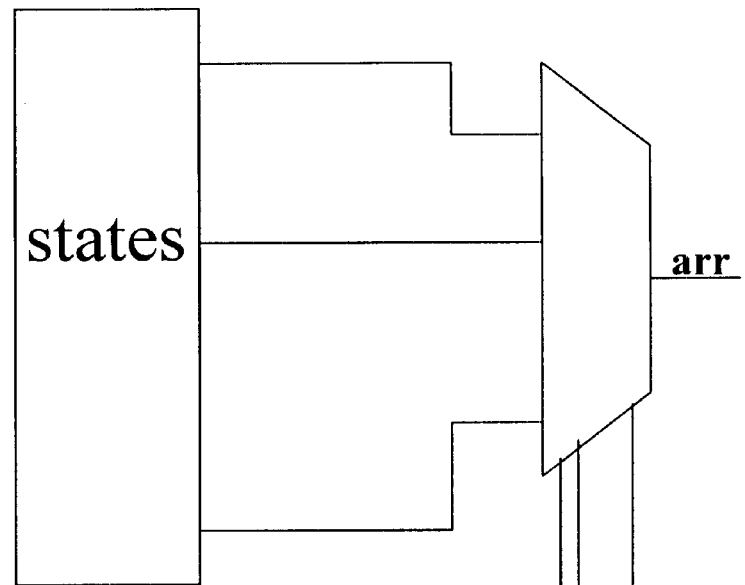
FIG. 8 shows logic corresponding to semantic logic according to the preferred embodiment.
Figure 8:
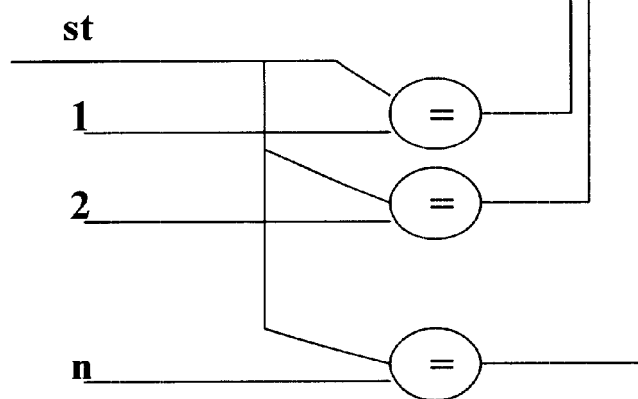

FIG. 8 shows the block diagram of the logic corresponding to this kind of semantic logic. The input signal "st" is compared with various constants to form various selection signals which are used to select certain bits from the state registers in a way consistent with the user_register specification. Using the previous state declaration, bit 32 of DATA maps to bit 0 of the second user register. Therefore, the second input of the MUX in this diagram should be connected to the 32nd bit of the DATA state.

The following semantic block can be generated to write the states "DATA", "KEYC", and "KEYD" with values from general purpose registers

```
iclass wur {WUR} {in art, in sr} {out DATA. out KEYC, out KEYD}
semantic wur (WUR) {
    wire sel_0 = (st == 8'd0);
    wire sel_1 = (st == 8'd1);
    wire sel_2 = (st == 8'd2);
    wire sel_3 = (st == 8'd3);
    assign DATA ={sel_1 ? art : DATA[63:32], sel_0 ? art : DATA[31:0]};
    assign KEYC = art;
    assign KEYD = art;
    assign DATA_we = WUR;
    assign KEYC_we = WUR & sel_2;
    assign KEYD_we = WUR & sel_3;
}
```

Figure 9:
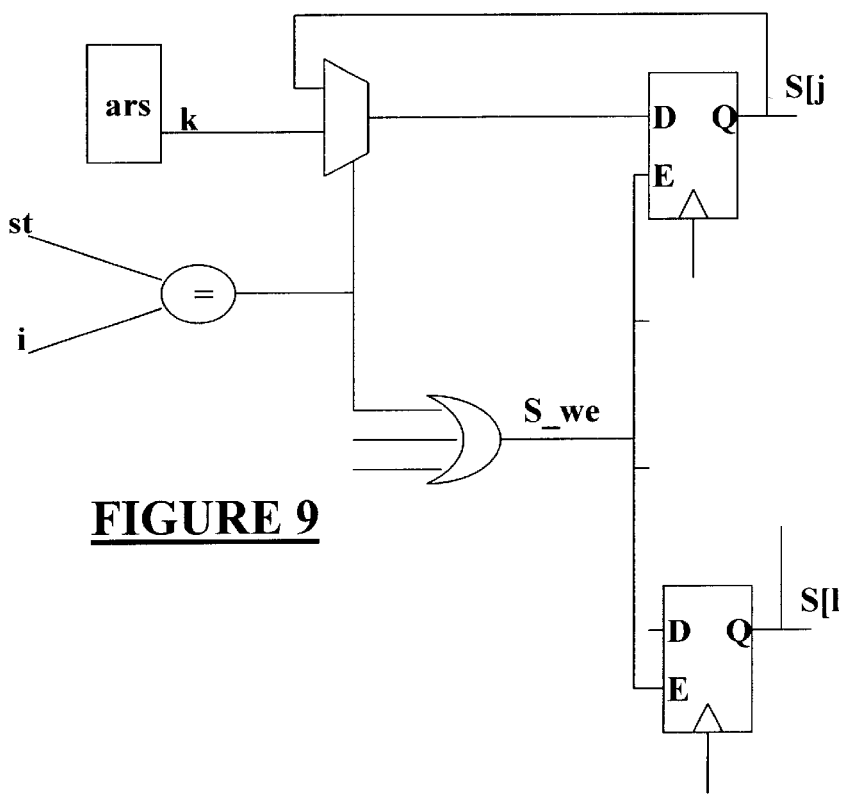
FIG. 9 shows the logic for a bit of state when it is mapped to the a bit of a user register in the preferred embodiment.

FIG. 9 shows the logic for the jth bit of state S when it is mapped to the kth bit of the ith user register. If the user_register number "st" in a WUR instruction is "i", the kth bit of "ars" is loaded into the S[j] register; otherwise, the original value of S[j] is recirculated. In addition, if any bit of the state S is reloaded, the signal S_we is enabled.

The TIE user_register declaration specifies a mapping from additional processor state defined by state declarations to an identifier used by these RUR and WUR instructions to read and write this state independent of the TIE instructions.

Appendix C shows the code for generating RUR and WUR instructions.

The primary purpose for RUR and WUR is for task switching. In a multi-tasking environment, the multiple software tasks share the processor, running according to some scheduling algorithm. When active, the task's state resides in the processor registers. When the scheduling algorithm decides to switch to another task, the state held in the processor registers is saved to memory, and another task's state is loaded from memory to the processor registers. The Xtensa™ Instruction Set Architecture (ISA) includes the RSR and WSR instructions to read and write the state defined by the ISA. For example, the following code is part of the task "save to memory":

```
// save special registers
rsr a0, SAR
rsr a1, LCOUNT
s32i a0, a3, UEXCSAVE + 0
s32i a1, a3, UEXCSAVE + 4
rsr a0, LBEG
rsr a1, LEND
s32i a0, a3, UEXCSAVE + 8
s32i a1, a3, UEXCSAVE + 12
; if (config_get_value("IsaUseMAC16") {
    rsr a0, ACCLO
    rsr a1, ACCHI
    s32i a0, a3, UEXCSAVE + 16
    s32i a1, a3, UEXCSAVE + 20
    rsr a0, MR_0
    rsr a1, MR_1
    s32i a0, a3, UEXCSAVE + 24
    s32i a1, a3, UEXCSAVE + 28
    rsr a0, MR_2
    rsr a1, MR_3
    s32i a0, a3, UEXCSAVE + 32
    s32i a1, a3, UEXCSAVE + 36
; }
``` and the following code is part of the task "restore from memory":

```
// restore special registers
    l32i a2, a1, UEXCSAVE + 0
    l32i a3, a1, UEXCSAVE + 4
    wsr a2, SAR
    wsr a3, LCOUNT
    l32i a2, a1, UEXCSAVE + 8
    l32i a3, a1, UEXCSAVE + 12
    wsr a2, LBEG
    wsr a3, LEND
;if (config_get_value("IsaUseMAC16") ) {
    l32i a2, a1, UEXCSAVE + 16
    l32i a3, a1, UEXCSAVE + 20
    wsr a2, ACCLO
    wsr a3, ACCHI
    l32i a2, a1, UEXCSAVE + 24
    l32i a3, a1, UEXCSAVE + 28
    wsr a2, MR_0
    wsr a3, MR_1
    l32i a2, a1, UEXCSAVE + 32
    l32i a3, a1, UEXCSAVE + 36
    wsr a2, MR_2
    wsr a3, MR_3
; }
``` where SAR, LCOUNT, LBEG, LEND are processor state registers part of the core Xtensa™ ISA, and ACCLO, ACCHI, MR_0, MR_1, MR_2, and MR_3 are part of the MAC 16 Xtensau ISA option. (The registers are saved and restored in pairs to avoid pipeline interlocks.)

When the designer defines new state with TIE, it too must be task switched like the state above. One possibility would be for the designer to simply go edit the task switch code (a portion of which is given above) and add RUR/S32I and L32I/WUR instructions analogous to the code above. However, configurable processors are most effective when the software is generated automatically and is correct by construction. Thus this invention includes a facility to augment the task switch code automatically. The following tpp lines are added to the above save task:

```
    ; my $off = 0;
    ; my $i;
    ; for ($i = 0; $i < $#user_registers; $i += 2) {
        rur a2, '$user_registers[$i+0]'
        rur a3, '$user_registers[$i+1]'
        s32i a2, UEXCUREG + '$off +0'
        s32i a3, UEXCUREG + '$off +4'
    ; }
    ; $off += 8;
    ; if (@user_registers & 1) {
    ; # odd number of user registers
        rur a2, '$user_registers[$#user_registers]'
        s32i a2, UEXCUREG + '$off + 0'
    ; $off += 4;
    ; }
``` and the following lines are added to the above restore task:

```
    ; my $off = 0;
    ; my $i;
    ; for ($i = 0; $i < $#user_registers; $i += 2) {
        l32i a2, UEXCUREG + '$off + 0'
        l32i a3, UEXCUREG + '$off + 4'
        wur a2, '$user_registers[$i+0]'
        wur a3, '$user_registers[$i+1]'
    ; $off += 8;
    ; }
    ; if (@user_registers & 1) {
    ; # odd number of user registers
        l32i a2, UEXCUREG + '$off + 0'
        wur a2, '$user_registers[$#user_registers]'
    ; $off += 4;
    ; }
```

Finally, the task state area in memory must have additional space allocated for the user register storage, and the offset of this space from the base of the task save pointer is defined as the assembler constant UEXCUREG. This save area was previously defined by the following code

```
    #define UEXCREGSIZE (16*4)
    #define UEXCPARMSIZE (4*4)
    ;if (&config_get_value("IsaUseMAC16") ) {
    #define UEXCSAVESIZE (10*4)
    ; }else {
    #define UEXCSAVESIZE (4*4)
    ; }
    #define UEXCMISCSIZE (2*4)
    #define UEXCPARM 0
    #define UEXCREG (UEXCPARM+UEXCPARMSIZE)
    #define UEXCSAVE (UEXCREG+UEXCREGSIZE)
    #define UEXCMISC (UEXCSAVE+UEXCSAVESIZE)
    #define UEXCWIN (UEXCMISC+0)
    #define UEXCFRAME (UEXCREGSIZE+
        UEXCPARMSIZE+UEXCSAVESIZE+
        UEXCMISCSIZE)
``` which is changed to

```
    #define UEXCREGSIZE (16*4)
    #define UEXCPARMSIZE (4*4)
    ;if (&config_get_value("IsaUseMAC16") ) {
    #define UEXCSAVESIZE (10*4)
    ; }else
    #define UEXCSAVESIZE (4*4)
    #define UEXCMISCSIZE (2*4)
    #define UEXCUREGSIZE @user_registers * 4
    #define UEXCPARM 0
    #define UEXCREG (UEXCPARM+UEXCPARMSIZE)
    #define UEXCSAVE (UEXCREG+UEXCREGSIZE)
    #define UEXCMISC (UEXCSAVE+UEXCSAVESIZE)
    #define UEXCUREG (UEXCMISC+UEXCMISCSIZE)
    #define UEXCWIN (UEXCUREG+0)
    #define UEXCFRAME \
        (UEXCREGSIZE+UEXCPARMSIZE+
        UEXCSAVESIZE+UEXCMISCSIZE+
        UEXCUREGSIZE)
```

This code is dependent on there being a tpp variable @user_registers with a list of the user register numbers. This is simply a list created from the first argument of every user_register statement.

In some more complex microprocessor implementations, a state can be computed in different pipeline states. Handling this requires several extensions (albeit simple ones) to the process described here. First, the specification language needs to be extended to be able to associate a semantic block with a pipeline stage. This can be accomplished in one of several ways. In one embodiment, the associated pipeline stage can be specified explicitly with each semantic block.

In another embodiment, a range of pipeline stages can be specified for each semantic block. In yet another embodiment, the pipeline stage for a given semantic block can be automatically derived depending on the required computational delay.

The second task in supporting state generation at different pipeline stages is to handle interrupts, exceptions, and stalls. This usually involves adding appropriate bypass and forward logic under the control of pipeline control signals. In one embodiment, a generate-usage diagram can be generated to indicate the relationship between when the state is generated and when it is used. Based on application analysis, appropriate forward logic can be implemented to handle the common situation and interlock logic can be generated to stall the pipeline for the cases not handled by the forwarding logic.

The method for modifying the instruction issue logic of the base processor dependent on the algorithms employed by the base processor. However, generally. speaking, instruction issue logic for most processors, whether single-issue or superscalar, whether for single-cycle or multi-cycle instructions, depends only on for the instruction being tested for issue:

1. signals that indicate for each processor state element whether the instruction uses the states as a source;
2. signals that indicate for each processor state element whether the instruction uses the states as a destination; and
3. signals that indicate for each functional unit whether the instruction uses the functional units;

These signals are used to perform issue to pipeline and cross-issue checks and to update the pipeline status in the pipeline-dependent issue logic. TIE contains all the necessary information to augment the signals and their equations for the new instructions.

First, each TIE state declaration cause a new signal to be created for the instruction issue logic. Each in or inout operand or state listed in the third or fourth argument to the iclass declaration adds the instruction decode signal for the instructions listed in the second argument to the first set of equations for the specified processor state element.

Second, each out or inout operand or state listed in the third or fourth argument to the iclass declaration adds the instruction decode signal for the instructions listed in the second argument to the second set of equations for the specified processor state element.

Third, the logic created from each TIE semantic blocks represents a new functional unit, so a new unit signals are created, and the decode signals for the TIE instructions specified for the semantic block are OR'd together to form the third set of equations.

When an instruction is issued, the pipeline status must be updated for future issue decisions. Again the method for modifying the instruction issue logic of the base processor dependent on the algorithms employed by the base processor. However, again some general observations are possible. The pipeline status must provide the following status back to the issue logic:

4. signals that indicate for each issued instruction destination when that result is available for bypass;
5. signals for each functional unit that indicate the functional unit is ready for another instruction.

The preferred embodiment described herein is a single-issue processor where the designer-defined instructions are limited to a single cycle of logic computation. In this case the above simplifies considerably. There is no need for the functional unit checks or cross-issue checks, and no single-cycle instruction can make a processor state element to be not pipeready for the next instruction. Thus the issue equation becomes just issue (~src1use | src1pipeready) & (src2use | src2pipeready)
.
.
.
& (~srcNuse | srcNpipeready);

and where the src[i]pipeready signals are unaffected by the additional instructions and src[i]use are the first set of equations described and modified as explained above. In the preferred embodiment, the fourth and fifth set of signals are not required. For an alternate embodiment that is multi-issue with multi-cycle, the TIE specification would be augmented with a latency specification for each instruction giving the number of cycles over which to pipeline the computation.

The fourth set of signals would be generated in each semantic block pipe stage by OR'ing together the instruction decode signals for each instruction that completes in that stage according to the specification.

By default the generated logic will be fully pipelined, and so the TIE generated functional units will always be ready one cycle after accepting an instruction. In this case the fifth set of signals for TIE semantic blocks is always asserted. When it is necessary to reuse logic in the semantic blocks over multiple cycles, a further specification will specify how many cycles the functional unit will be in use by such instructions. In this case the fifth set of signals would be generated in each semantic block pipe stage by OR'ing together the instruction decode signals for each instruction that finishes with the specified cycle count in that stage.

Alternatively, in a still different embodiment, it may be left as an extension to TIE for the designer to specify the result ready and finctional unit ready signals.

Examples of code processed according to the preferred embodiment are shown in the attached Appendices. For brevity, these will not be explained in detail; however, they will be readily understood by those skilled in the art after review of the reference manuals described above. Appendix D is an example of implementation of an instruction using the TIE language; Appendix E shows what the TIE compiler generates for the compiler using such code. Similarly, Appendix F shows what the TIE compiler generates for the simulator; Appendix G shows what the TIE compiler generates for macro expanding the TIE instructions in a user application; Appendix H shows what tie compiler generates to simulate TIE instructions in native mode; Appendix I shows what tie compiler generates as Verilog HDL description for the additional hardware; and Appendix J shows what the TIE compiler generates as Design Compiler script to optimize the Verilog HDL description above to estimate the area and speed impact of the TIE instruction on the total CPU size and performance.

The above description of the preferred embodiment of the present invention has been given for purposes of illustration only, and the invention is not so limited. Modification and variations thereof will become readily apparent to those skilled in the art, and these too are within the scope of the invention. Thus, the present invention is limited only by the scope of the appended claims.

What is claimed is:

1. A system for designing a configurable processor, the system comprising:

means for generating a configuration specification having a user-definable portion, the user-definable portion of the configuration specification including
   a specification of user-defined processor state, and
   at least one user-defined instruction and a user-defined function associated therewith, the function including at least one of reading from and writing to the user-defined processor state; and
means for, based on a configuration specification, generating a description of a hardware implementation of the processor.

2. The system of claim 1, wherein the software development tools are for generating software development tools to generate code to run on the processor.

3. The system of claim 2, wherein:
   the hardware implementation of the processor describes an instruction execution pipeline; and
   the control logic includes portions associated with each stage of the instruction execution pipeline.

4. The system of claim 3, wherein:
   the hardware implementation description includes a description of circuitry for aborting instruction execution; and
   the control logic includes circuitry for preventing modification of the user-defined state by aborted instructions.

5. The system of claim 4, wherein the control logic includes circuitry for performing at least one of an instruction issue, an operand bypass and an operand write enable for the at least one user-defined instruction.

6. The system of claim 3, wherein the hardware implementation description includes registers for implementing the user-defined state in a plurality of stages of the instruction execution pipeline.

7. The system of claim 3, wherein:
   the hardware implementation description includes state registers written in a different pipeline stage than one in which output operands are produced; and
   the hardware implementation description specifies that such writes are bypassed into subsequent instructions that reference the user-defined processor state before writes to the state are committed.

8. The system of claim 1, wherein;
   the configuration specification includes a predetermined portion in addition to the user-defined portion; and
   the predetermined portion of the specification includes an instruction for facilitating saving the user-defined state to memory and an instruction for facilitating restoring the user-defined state from memory.

9. The system of claim 8, further comprising means for generating software to context switch the user-defined state using the instruction.

10. The system of claim 9, wherein the instruction set simulator is to model execution of code being simulated to measure key performance criteria including cycles of execution.

11. The system of claim 1, further comprising means for producing a compiler for compiling the user-defined processor state and the at least one user-defined instruction.

12. The system of claim 10, wherein the instruction set simulator is to profile execution of the program being simulated to record standard profiling statistics, including a number of cycles executed in each simulated function.

13. The system of claim 1, further comprising means for producing a debugger for debugging the user-defined processor state and the at least one user-defined instruction.

14. The system of claim 1, further comprising means for producing an assembler for assembling the user-defined processor state and the at least one user-defined instruction, a compiler for compiling the user-defined processor state and the at least one user-defined instruction, a simulator for simulating the user-defined processor state and the at least one user-defined instruction and a debugger for debugging the user-defined processor state and the at least one user-defined instruction.

15. The system of claim 1, wherein the user-defined portion of the specification includes at least one statement specifying a size and indexing of the user-defined state.

16. The system of claim 15, wherein the user-defined portion of the specification includes at least one attribute associated with the user-defined state and specifying packing of the user-defined state in a processor register.

17. The system of claim 1, wherein the user-defined portion of the specification includes at least one statement specifying a mapping of the user-defined state to processor registers.

18. The system of claim 1, wherein the means for generating the hardware implementation description includes means for automatically mapping the user-defined state to processor registers.

19. The system of claim 1, wherein the user-defined portion of the specification includes at least one statement specifying a class of user-defined instructions and its effect on the user-defined state.

20. The system of claim 1, wherein the user-defined portion of the specification includes at least one assignment statement assigning a value to the user-defined state.

* * * * *

UNITED STATES PATENT AND TRADEMARK OFFICE
CERTIFICATE OF CORRECTION

| | | |
|---|---|---|
| PATENT NO. | : 6,477,697 B1 | Page 1 of 1 |
| APPLICATION NO. | : 09/322735 | |
| DATED | : November 5, 2002 | |
| INVENTOR(S) | : Earl A. Killian et al. | |

It is certified that error appears in the above-identified patent and that said Letters Patent is hereby corrected as shown below:

Col. 19, line 12
  replace "the software"
  with --software--.
Col. 19, line 13
  replace "are for"
  with --are generated by a means for--.
Col. 19, line 18
  replace "the control"
  with --control--.

Signed and Sealed this

Fourteenth Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 6,477,697 B1
APPLICATION NO. : 09/322735
DATED : November 5, 2002
INVENTOR(S) : Earl A. Killian et al.

It is certified that error appears in the above-identified patent and that said Letters Patent is hereby corrected as shown below:

Col. 19, line 12
 replace "the software"
 with --software--.

Col. 19, line 13
 replace "are for"
 with --are generated by a means for--.

Column 19, line 18
 replace "the control"
 with --control--.

Signed and Sealed this

Twelfth Day of June, 2007

JON W. DUDAS
*Director of the United States Patent and Trademark Office*